US010360322B2

(12) United States Patent
Eckmann et al.

(10) Patent No.: US 10,360,322 B2
(45) Date of Patent: Jul. 23, 2019

(54) SIMULATION OF VIRTUAL PROCESSORS (71) Applicant: International Business Machines Corporation, Armonk, NY (US)

(72) Inventors: Sascha Eckmann, Schloss Holte-Stukenbrock (DE); Thomas Gardelegen, Mainz (DE); Wolfgang Gellerich, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 15/187,825

(22) Filed: Jun. 21, 2016

(65) Prior Publication Data
US 2017/0154136 A1    Jun. 1, 2017

Related U.S. Application Data (63) Continuation of application No. 14/955,675, filed on Dec. 1, 2015.

(51) Int. Cl.
G06F 13/10      (2006.01)
G06F 17/50      (2006.01)
G06F 9/455      (2018.01)

(52) U.S. Cl.
CPC .......... G06F 17/5009 (2013.01); G06F 9/455 (2013.01)

(58) Field of Classification Search
CPC .................................. G06F 17/5009
USPC ........................................... 703/21
See application file for complete search history.

(56) References Cited

U.S. PATENT DOCUMENTS

| 6,134,710 | A  | 10/2000 | Levine |
| 6,321,276 | B1 | 11/2001 | Forin |
| 7,343,590 | B2 | 3/2008  | Tormey et al. |
| 7,346,481 | B1 | 3/2008  | Ballagh et al. |
| 7,684,971 | B1 | 3/2010  | Larsson et al. |
| 8,463,589 | B2 | 6/2013  | Clark et al. |
| 8,495,344 | B2 | 7/2013  | Henry et al. |
| 8,554,535 | B2 | 10/2013 | Nohl et al. |
| 8,725,486 | B2 | 5/2014  | Oh et al. |

(Continued)

FOREIGN PATENT DOCUMENTS

| JP | 5379862 B2     | 12/2013 |
| JP | 5512503 B2     | 6/2014  |
| WO | 2013099438 A1  | 7/2013  |

OTHER PUBLICATIONS

IBM Appendix P, list of IBM patents or patent applications treated as related, pp. 1-2, filed on Jun. 21, 2016.

(Continued)

Primary Examiner — Hugh M Jones
(74) Attorney, Agent, or Firm — Andrew Aubert (57) ABSTRACT One or more processors receive a breakpoint. The breakpoint is paired with a resume point. One or more processors execute a set of machine instructions on a virtual processor model. One or more processors halt execution of the set of machine instructions on the virtual processor model at the breakpoint. One or more processors execute a fragment of a program instruction on a physical processor. The fragment is logically equivalent to the set of machine instructions between the breakpoint and the resume point. One or more processors load a processed result into the virtual processor model. The processed result results from executing the fragment on the physical processor. One or more processors resume the execution of the set of machine instructions on the virtual processor model at the resume point.

7 Claims, 5 Drawing Sheets (56) References Cited

U.S. PATENT DOCUMENTS

| | | |
|---|---|---|
| 9,026,966 B1 | 5/2015 | Ramachandran et al. |
| 2005/0108711 A1 | 5/2005 | Arnold |
| 2011/0246170 A1 | 10/2011 | Oh et al. |
| 2011/0295587 A1 | 12/2011 | Eeckhout et al. |
| 2013/0173887 A1 | 7/2013 | Kenney et al. |

OTHER PUBLICATIONS

List of IBM Patents or Patent Applications Treated as Related; Dated May 26, 2016; 2 pages.

SIMULATION OF VIRTUAL PROCESSORS

BACKGROUND OF THE INVENTION

The present invention relates generally to the field of processor modeling, and more particularly to the simulation of virtual processors.

The design of new processors such as CPUs, microcontrollers, smartcards and others can be supplemented by modeling them using a hardware description language such as VHDL, Verilog, or others. Depending upon the hardware description language used and the simulation environment, different aspects of a processor design can be evaluated. Physical aspects such as heat generation or power usage can be modeled and valuated. The functioning of the processor design can be checked for errors and benchmark programs can be run.

SUMMARY

In one aspect embodiments of the present invention relate to a method of simulating a virtual processor implemented in a hardware description language by executing machine instructions. The method comprises providing a model of the virtual processor in the hardware description language to a simulation environment. A simulation environment as used herein may encompass a processor and/or software necessary for executing or running the model on the virtual processor. The method further comprises providing at least one breakpoint. Each of the at least one breakpoint is paired with a resume point. A breakpoint is a point where the machine instructions halt. The paired resume point is a point in the machine instructions where the simulation is resumed after the breakpoint is reached.

The method further comprises beginning the simulation by executing the machine instructions on the virtual processor in the simulation environment. The method further comprises halting the simulation at the at least one breakpoint. There may, for example, be a number of breakpoints within the machine instructions. The method would go through and execute the machine instructions sequentially until one of the breakpoints is reached. The method further comprises storing state data in a memory. The state data is descriptive of the processor state at the at least one breakpoint. The state data, for instance, may contain the data within registers or memory locations accessed by the virtual processor. The method further comprises transferring the state data to a physical processor. The state data may be used as input to program instruction fragments that are executed on the physical processor.

The method further comprises executing program instruction fragments on the physical processor using the state data as input. The program instruction fragments are logically equivalent to the machine instructions between the at least one breakpoint and the paired resume point. The program instruction fragments are logically equivalent to the machine instructions in the sense that when executed on the physical processor it executes a logically equivalent program. The program instruction fragments need not be identical instructions or code but the resulting function of the program such as numerical calculations are equivalent. The method further comprises storing the results of the program instruction fragment in the memory. The results of the program instruction fragment may then be used as input to restart the simulation of the model of the virtual processor. The method further comprises loading the execution results of the program instruction fragment into the simulation environment. The method then further comprises resuming the simulation at the resume point paired to the at least one breakpoint.

In another aspect, embodiments of the present invention provide for a simulation environment for simulating a virtual processor implemented in a hardware description language. The simulation environment comprises a physical processor. The simulation environment comprises a memory for storing system program instructions. Execution of the system program instructions may cause the physical processor to execute an embodiment or example of a method as described herein or as in the claims.

In another aspect, embodiments of the present invention may provide for a computer program product for simulating a virtual processor implemented in a hardware description language. Said computer program product may comprise a computer-readable storage medium having stored thereon first program instructions executable by a physical processor in a simulation environment that cause the device to perform a method of simulating a virtual processor implemented in the hardware description language by executing machine instructions as described herein or as in the claims.

Embodiments of the present invention and/or examples described herein can be freely combined with each other if they are not mutually exclusive.

DETAILED DESCRIPTION

In many scenarios, processor development typically makes use of simulations to verify the processor or parts thereof before building a real chip. Running an operating system, however, requires simulating a rather complete computer system. This requirement may be difficult to fulfill due to the execution time of the simulator. A simulated processor is usually several orders of magnitude slower than a physical processor. Also, other system resources like the available main memory might be a limiting factor. Thus, there may be significant delays in the evaluation and modification of processor designs due to this delay.

Embodiments of the present invention recognize that running a complete operating system on a processor simulator is accelerated by executing time- or memory-consuming fragments of the simulation on a physical processor within the simulation environment.

The present invention will now be described in detail with reference to the Figures.

Figure 1:
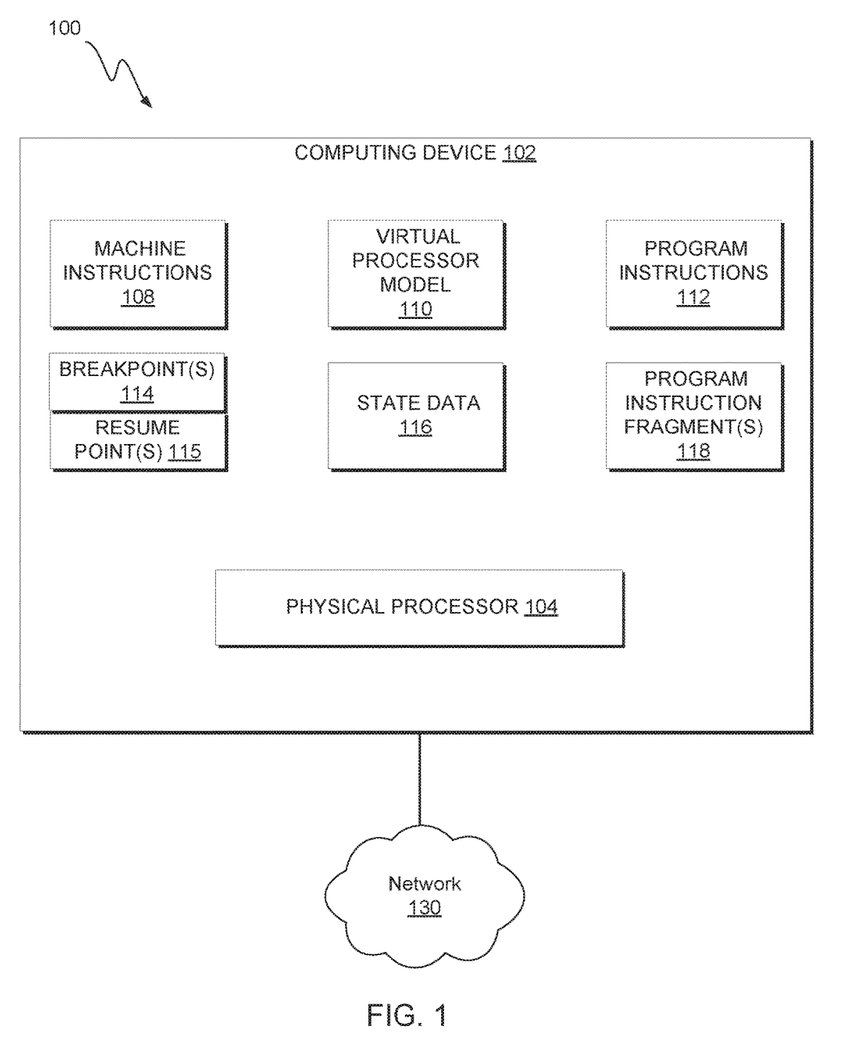
FIG. 1 is a functional block diagram illustrating a virtual processor simulation environment, in accordance with an exemplary embodiment of the present invention.

FIG. 1 is a functional block diagram illustrating a virtual processor simulation environment, generally designated 100, in accordance with one embodiment of the present invention. Virtual processor simulation environment 100 includes computing device 102 connected over network 130. Computing device 102 includes machine instructions 108, virtual processor model 110, program instructions 112, paired breakpoint(s) 114 and resume point(s) 115, state data 116, program instruction fragment(s) 118, and physical processor 104.

In various embodiments of the present invention, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to the software and data components of virtual processor simulation environment 100 and is capable of executing a virtual processor simulation according to exemplary embodiments of the present invention. Computing device 102 may include internal and external hardware components, as depicted and described in further detail with respect to FIG. 6.

In this exemplary embodiment, machine instructions 108, virtual processor model 110, program instructions 112, paired breakpoint(s) 114 and resume point(s) 115, state data 116, and program instruction fragment(s) 118 are stored on computing device 102. However, in other embodiments, machine instructions 108, virtual processor model 110, program instructions 112, paired breakpoint(s) 114 and resume point(s) 115, state data 116, and program instruction fragment(s) 118 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 102 and the software and data components of virtual processor simulation environment 100, in accordance with a desired embodiment of the present invention.

In exemplary embodiments, machine instructions 108 are the machine code that is the result of compiling the source code associated with program instructions 112.

In exemplary embodiments, virtual processor model 110 is a model used in the simulation of a virtual processor according to exemplary embodiments of the present invention. Virtual processor model 110 is provided in a hardware description language to the simulation environment.

In exemplary embodiments, program instructions 112 provide the environment for simulating virtual processor model 110. Virtual processor model 110 executes within the framework of program instructions 112.

In exemplary embodiments, breakpoint(s) 114 are point(s) in machine instructions 108 where the execution of the machine instructions is halted. Resume point(s) 115 are paired with breakpoint(s) 114, i.e., every breakpoint has a paired resume point. Resume point(s) 115 are point(s) in machine instructions 108 where the simulation is resumed following the halt of machine instructions 108 by a paired breakpoint.

In exemplary embodiments, state data 116 is a description of the virtual processor model 110 state when it is halted at a breakpoint. In various embodiments, state data 116 contains the data within registers or memory locations accessed by virtual processor model 110.

In exemplary embodiments, program instruction fragments 118 are fragments of machine instructions 108 between a breakpoint and the corresponding paired resume point. Program instruction fragments 118 are executed on physical processor 104 using state data 116 as input and the results of the execution are input into virtual processor model 110 upon resumption of the processor simulation at a resume point. Program instruction fragments 118 are machine code that would normally be executed by virtual processor model 110. The results of the execution of program instruction fragments 118 are then used in the processor simulation as the logical equivalent of the same code having been executed by virtual processor model 110. In various embodiments, program instruction fragments 118 are logically equivalent to machine instructions in the sense that, when executed on physical processor 104, it executes a logically equivalent program code. Program instruction fragments 118 need not be instructions or code, but the resulting function of the instruction or code such as numerical calculations.

In exemplary embodiments, physical processor 104 is one or more computing device processors. In the embodiment of FIG. 1, physical processor 104 is a processor or processors associated with computing device 102. In other embodiments, physical processor 104 is one or more processors associated with one or more other computing devices accessible through, for example, a network such as network 130.

Figure 2:
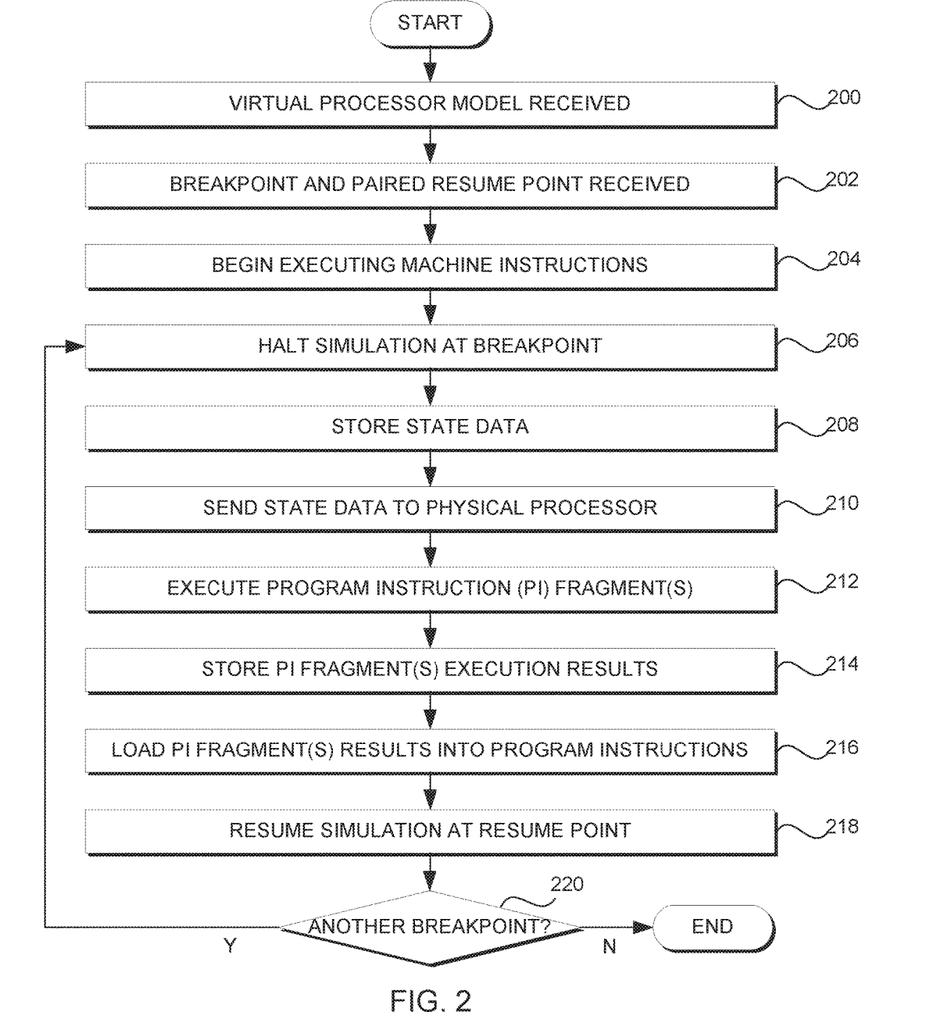
FIG. 2 illustrates operational processes for a virtual processor simulation, on a computing device within the environment of FIG. 1, in accordance with an exemplary embodiment of the present invention.

FIG. 2 illustrates operational processes for a virtual processor simulation, on computing device 102 within virtual processor simulation environment 100 of FIG. 1, in accordance with an exemplary embodiment of the present invention.

FIG. 2 shows a flowchart which illustrates a method of operating program instructions 112 and computing device 102 shown in FIG. 1 in order to simulate the virtual processor.

In step 200 virtual processor model 110 is provided in a hardware description language to program instructions 112.

In step 202, at least one breakpoint(s) 114 and the paired resume point(s) 115 are provided. For example, breakpoint(s) 114 and the paired resume point(s) 115 could be provided by receiving them over a computer network or being typed in by a user. In other examples, the physical processor 104 executes code that identifies the location of breakpoint(s) 114 and resume point(s) 115 automatically.

In step 204, the simulation is begun by executing the machine instructions 108 on virtual processor model 110 in virtual processor simulation environment 100.

In step 206, the simulation is halted at a first encountered breakpoint(s) 114.

In step 208, state data 116 is stored in the memory 106. State data 116 is descriptive of the virtual processor state model 110 when virtual processor state model 110 is halted at the breakpoint.

In step 210, state data 116 is sent to physical processor 104. In some scenarios and embodiments, it is advantageous to executing program instruction fragments 118 on physical processor 104 because the simulation of the virtual processor is executed faster.

In step 212, program instruction fragments 118 are executed on physical processor 104 using state data 116 as input. Program instruction fragments 118 are logically equivalent to portions of the machine instructions 108 between the at least one breakpoint(s) 114 and the paired resume point(s) 115.

In step 214, the results of processing the program instruction fragments 118 by physical processor 104 are stored in computing device 102 storage.

In step 216, the stored execution results from physical processor 104 processing of program instruction fragments 118 are loaded into program instructions 112.

In step 218, the simulation is resumed at the resume point(s) 115 that is paired with the at least one breakpoint(s) 114.

In decision step 220, if there are no more breakpoint(s) 114 (i.e., "N"), then processing program instruction fragments 118 with physical processor 104 ceases for the simulation. If there are more breakpoints (yes branch of decision step 220, i.e., "Y"), then the simulation continues to execute machine instructions 108 on virtual processor model 110 until the next breakpoint(s) 114 is reached and the process goes to step 206. This loop of steps is repeated until all of breakpoint(s) 114 have been reached.

In one example, the method described herein may be repeated multiple times. In some scenarios and embodiments, it is advantageous to execute multiple blocks of program instruction fragments on the physical processor in order to speed up the simulation of the virtual processor.

In another example, the method further includes providing initial program source code. The method further includes transforming the initial program source code into the machine instructions with a first program source code translator. A program source code translator as used herein encompasses a compiler or an assembler. In the case of a high-level language such as C or C++, the program source code is compiled. In other examples, the program source code may for example be millicode. In this case, the millicode is translated or assembled into machine language. Millicode, as used herein, encompasses a higher level of microcode used to implement the instruction set of a computer or processor. For example, millicode runs on top of microcoded instructions and uses those instructions to implement more complex instructions. The method further includes locating at least one code fragment in the initial program source code. The at least one code fragment is a portion of the initial program source code corresponding to the machine instructions between one of the at least one breakpoint paired with the resume point.

The method further includes transforming the at least one code fragment into the program instruction fragments with a second source code translator. In some examples, the first and second source code translator are identical and are used to generate equivalent code. In other examples, the compiler or translator instructions are different because the codes or machine language instructions of the virtual processor and the physical processor are different. In some scenarios and embodiments, it is advantageous to use the second source code translator because the machine language commands of the physical processor and the virtual processor are different. In such scenarios and embodiments, the use of the second source code translator provides program instruction fragments that are able to functionally replace portions of the machine instructions.

In one example, when the initial program source code is translated into the machine instructions, the portions of the code between the breakpoints and the resume points is deleted or not compiled. In some scenarios and embodiments, it is advantageous to reduce the amount of memory needed for the simulation. In other examples, the entire initial program source code is compiled or translated into the machine instructions. In some scenarios and embodiments, this is advantageous because the machine instructions are used without using the breakpoints and start points also.

In another example, the machine instructions are millicode and the at least one machine instruction fragment is millicode. In some scenarios and embodiments, the use of millicode is advantageous because millicode is an intermediate language that is translated into machine language for many processor types easily. In other words, the use of millicode as the initial program source code is useful because millicode is easily translated or assembled into machine language for use on different processors. The use of millicode therefore facilitates the distribution execution of the machine instructions by multiple types of processors.

In another example, the machine instructions are firmware code. The at least one machine instruction fragment is firmware code. The use of firmware code provides for an effective way of accelerating a simulation because the firmware code is typically used to implement low-level computing operations for the functioning of an operating system. Accelerating the firmware code results in a reduction of the amount of time necessary to simulate the virtual processor.

In another example, the initial program source code is a high-level language such as C, C++, Pascal, Fortran, or other high-level development language. In some scenarios and embodiments, it is advantageous to use a high-level language for the initial program source code because repetitive loops in the initial program source code are easy to identify, which are then translated into the breakpoints and resume points.

In another example, the at least one breakpoint and the resume point are paired with the at least one breakpoint as identified by the program source code translator. For example, the program source code translator is used to identify computationally intensive portions of the initial program source code and to mark these to be executed on the physical processor. In some embodiments, such a pairing is used, in part, to identify breakpoints and resume points, which are used to accelerate the simulation of the virtual processor.

In some scenarios and embodiments, the program source code translator identifies the at least one breakpoint at least partially by calculating an estimate of an execution time of portions of the machine instructions. In some scenarios and embodiments, the process of stopping the simulation of the virtual processor and transferring data to the physical processor consumes time above a threshold. As such, in some such scenarios and embodiments, calculations are only transferred to the physical processor if they result in a time savings.

In some scenarios and embodiments, the compiler identifies the at least one breakpoint at least partially by detecting a loop in the initial program instructions or the machine instructions. In some scenarios and embodiments, calculations that are repeated a large number of times result in time savings when transferred from execution on the virtual processor to the physical processor.

In some scenarios and embodiments, the loop calculates at least one firmware control block. In some scenarios and embodiments, the machine instructions are for an operating system. In some such scenarios and embodiments, the calculation of firmware control blocks can be computationally intensive and require a large time to simulate when booting the virtual processor into an operating system.

In some scenarios and embodiments, at least one breakpoint is set if the loop is executed above a predetermined number of repetitions. In some such scenarios and embodiments, if the first program source code translator identifies that a loop is calculated more than a predetermined number of times, then the calculation is moved from the virtual processor to the physical processor.

In some scenarios and embodiments, the first source code translator omits portions of the initial program source code between the at least one breakpoint paired with the resume point when generating the machine instructions. In some scenarios and embodiments, as instructions between a breakpoint and the paired resume point are not executed, it is not necessary to translate those instructions into the machine instructions. In some scenarios and embodiments, reducing or otherwise limiting the translation of such instructions into machine instructions results in memory savings in the virtual processor.

In some scenarios and embodiments, resuming the simulation at the resume point paired with the at least one breakpoint includes advancing the simulation to the at least one resume point paired with the at least one breakpoint. In some scenarios and embodiments, such an approach enables the use of computer instructions that can be used with or without the breakpoints and the resume points.

In some scenarios and embodiments, the simulation environment is a computing environment which is able to implement or execute models provided in any one of the following: VHDL, Verilog, MATLAB HDL coder, SystemC, and MyHDL. In some scenarios and embodiments, any of these modeling languages, or other like languages, are used to generate virtual processors, which in some scenarios and embodiments is accelerated using a method described herein.

In some scenarios and embodiments, the virtual processor is any one of the following: a CPU, a microcontroller, a smartcard, a controller, and a programmable digital signal processor. In some scenarios and embodiments, such types of processors and the like have operating systems or other computer code that is able to be accelerated using methods described herein.

In some scenarios and embodiments, the simulation environment includes the physical processor. In some scenarios and embodiments, if the simulation is stopped, then the physical processor is not needed to simulate the virtual processor. In some scenarios and embodiments, such an approach increases the effective use of the physical processor for the processing of instructions.

In some scenarios and embodiments, the simulation environment includes the physical processor on a separate machine from the machine that is executing the simulation of the processor. In some such scenarios and embodiments, the processors that are faster than the processor running the simulation environment are selected. In some scenarios and embodiments, a processor that is compatible with the virtual processor is selected, thereby reducing or eliminating, at least in part, an amount of translation between the machine instructions and the program instruction fragments.

In some scenarios and embodiments, the process of stopping at a breakpoint and then resuming at a resume point is repeated multiple times. In some such scenarios and embodiments, the model of the virtual processor has multiple breakpoints and multiple resume points set in the machine instructions. Some such scenarios and embodiments, such an approach provides an acceleration multiple times to the simulation.

In some scenarios and embodiments, the initial program instructions is an operating system. Applying the method of simulating the virtual processor to an operating system speeds up the process of booting into or starting a gradient system. In some such scenarios and embodiments, during the booting of an operating system, many repetitive numerical calculations are repeated many times. As such, offloading such repetitive numerical calculations to the physical processor speeds up the process of booting into or starting a gradient system.

In some scenarios and embodiments, the operating system is a POSIX-like operating system. Examples of POSIX-like operating systems include LINUX, BSD, and OS X. In some scenarios and embodiments, use of a POSIX-like operating system provides a compact operating system that can be tailored to reduce the memory and computing requirements for running the simulation.

In some scenarios and embodiments, the method further includes running benchmark program instructions or a diagnostic program instructions on the virtual processor after running the initial program instructions. In some scenarios and embodiments, the method includes booting the virtual processor into an operating system by executing the machine instructions. In some such scenarios and embodiments, after the processor has been booted into the operating system, comprehensive diagnostic programs or benchmark program instructions are used to evaluate the design of the virtual processor. In some scenarios and embodiments, such an approach provides, at least in part, an evaluation of the design of the virtual processor.

Figure 3:
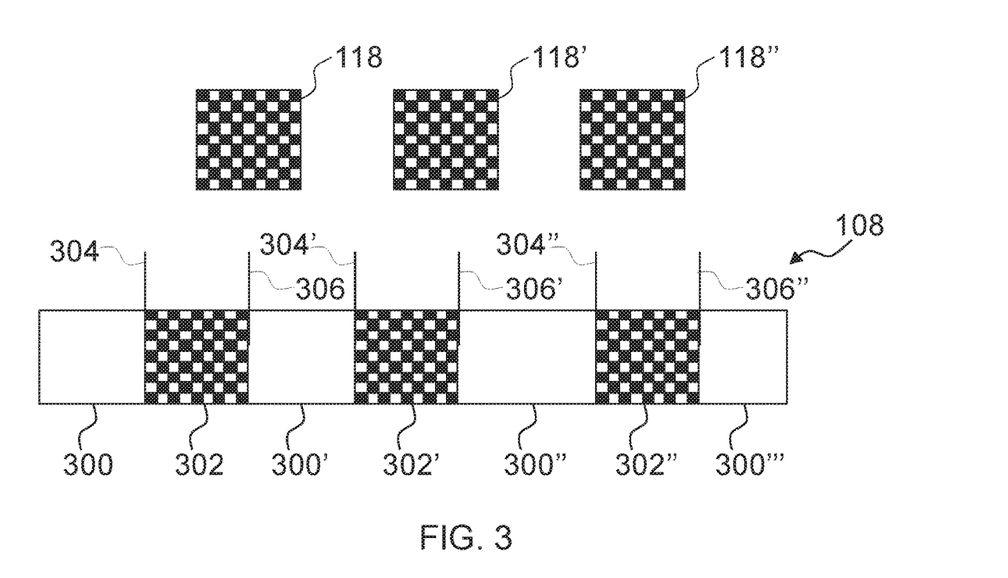
FIG. 3 illustrates a first example of machine instructions and program instruction fragments.

FIG. 3 shows a relationship between the machine instructions 108 and program instruction fragments 118. The bar labeled 108 represents complete machine instructions 108 for executing on virtual processor model 110. The lines labeled 304, 304', and 304" indicate a point in program instructions 112 where breakpoint(s) 114 are set in execution. The lines 306, 306', and 306" indicate where resume point(s) 115 are set. Breakpoint 304 is paired with resume point 306. Breakpoint 304' is paired with resume point 306'. Breakpoint example 304" is paired with resume point example 306". The portions of the machine instructions 108 labeled 300, 300', 300" and 300'" are portions of machine instructions 108 that are executed. The portions of the code labeled 300, 302', 302" are between the breakpoints and the resume points. These portions 302, 302', 302" are not executed. When the simulation reaches the block of code 302 the simulation is halted and instead physical processor 104 executes program instruction fragment 118. When the simulation reaches the block of code labeled 302' physical processor 104 executes the program instruction fragment 118'. When virtual processor model 110 reaches the execution of the blocks of code 302", the simulation stops and this execution is replaced by the program instruction fragment 118', which is executed on physical processor 104.

Figure 4:
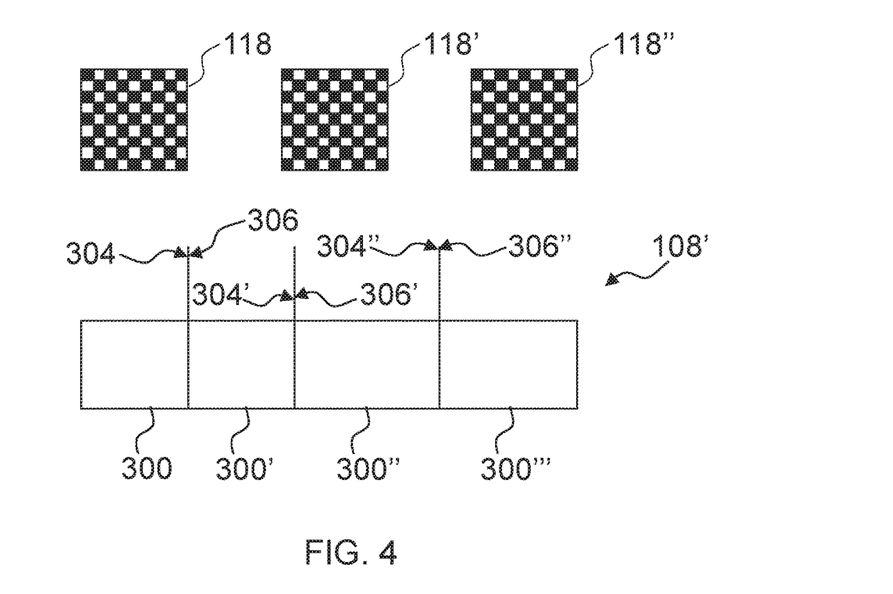
FIG. 4 illustrates a second example of machine instructions and program instruction fragments.

FIG. 4 shows an alternative scheme to FIG. 3. In FIG. 4, the blocks of code 302, 302' and 302" are not executed. The machine instructions 108 are therefore truncated to the machine instructions 108'. The machine instructions 108' are identical to the machine instructions 108 except that the portions of machine instructions 302, 302' and 302" have been removed. When the machine instructions 108' are executed and the first breakpoint 304 is reached, physical processor 104 executes the program instruction fragment 118. When the second breakpoint 304' is reached, physical processor 104 executes the program instruction fragment 118'. When the virtual processor model 110 reaches the third breakpoint 304", physical processor 104 executes the program instruction fragment 118". After the respective program instruction fragment 118, 118', and 118" is executed the program being executed by virtual processor model 110 does not need to be advanced. The results of the execution of the program instruction fragments are then loaded into the simulation and the execution of the machine instructions 108' continues.

Typical processor development usually makes use of simulations to verify the processor, or parts thereof, before building a real chip. Simulation-based verification covers both functional correctness as well as the performance of program execution. More realistic results can be achieved when a whole operating system like LINUX is executed on a simulator.

Running an operating system, however, can entail simulating a complete computer system. This requirement is often difficult to fulfill due to the execution time of the simulator. A simulated processor is usually several orders of magnitude slower than real hardware. Also, other system resources like available main memory might be a limiting factor.

Examples may describe a method to accelerate running a complete operating system on a processor simulator by getting some time or memory consuming parts of the simulated execution executed by the simulation environment.

In one example, Part of an IBM System z firmware calculates the contents of some data structures named "control blocks", stores the result into memory, and then calls a communication instruction that uses system-internal signaling to communicate the new contents to other processors part of the computer system.

In this example, the simulator receives the VHDL model of a new processor, usually in some compiled format, and provides a simulated processor which executed the software stack normally found in a computer system, i.e. system firmware, some operating system and a test or benchmark program running under control of the operating system.

In some scenarios and embodiments, it can be understood that part of the software executed by the simulated processor executes some code 1 that is slow and does not yield additional insight into the questions to be answered by the simulation (in this example, calculating the contents of Firmware control blocks). In some scenarios and embodiments, in order to accelerate execution and/or reduce memory consumption of the simulation, this calculation is moved into the simulation environment, which executes a second block of code (referred to as code 2 herein) for this purpose. In some scenarios and embodiments, the original calculation (code 1) is removed from Firmware. In some scenarios and embodiments, the communication instruction is, for example, implemented in millicode.

In some scenarios and embodiments, the simulation environment's debug facility provides a means for placing breakpoints at particular addresses. In some scenarios and embodiments, one such breakpoint is put into the millicode implementing the DIAG operation. In some scenarios and embodiments, when the flow of execution reaches said communication instruction, it enters millicode and passes the breakpoint. In some scenarios and embodiments, the debug facility supports to associate some action with a breakpoint. In some scenarios and embodiments, the action consists of performing the original calculation. In some such scenarios and embodiments, the calculation gets executed by the simulation environment, which is faster than the processor it simulates.

In some scenarios and embodiments, the simulation environment provides some memory (referred to as "M" herein), to which it has access and which is used by the simulated processor for executing software. In some scenarios and embodiments, the original code 1 stored its results into memory M. In some scenarios and embodiments, the code 2, executed by the simulation environment, stores its results into the same memory M, i.e. memory M is used for communication between the software executed by the simulated processor and the simulation environment.

In some scenarios and embodiments, after having finish this calculation, the millicode routine completes execution by returning to the instruction following the communication instruction call.

In contrast to what is known as Co-Simulation, some scenarios and embodiments do not require two separate simulations. Some such embodiments, do not switch between different models but moves parts of calculations originally performed by the processor being simulated to a different computing device. Further, in some such scenarios and embodiments, this second computing device need not be identical or similar to the one being simulated.

In some scenarios and embodiments, instead of identifying those section in the software (machine instructions) that are candidates for replacement by code executed in the simulation environment manually, an automatic approach is applied.

In some scenarios and embodiments, code sections to be replaced have two characteristics. First, the execution of such code sections is slow in that it takes a lot of simulation time when compared to the execution of other types of code, e.g., code that does not have many repeating code patterns and calculations. Second, the execution of the code consists of repeating code patterns such that the repetitions do not increase the test coverage achieved by the simulation run nor do they lead to other important insights.

In some scenarios and embodiments, such characterization results in an automatic detection by the compiler used to translate the Firmware from a high-level language (PL8, C, and C++ in the case of IBM System z Firmware) into a machine-executable binary. In some scenarios and embodiments, such an automatic detection is based, in part, on the identification of repeating code patterns that are found in loops which execute a loop body several times. In some such scenarios and embodiments, such an automatic detection is based, in part, on the speed of execution of the code, which depends on the execution time of the loop body. In some scenarios and embodiments, a predicted execution time, i.e. an amount of time it will take to process that code, is generated by the compiler from its knowledge of the code it generates for implementing the loop, and the number of iterations the loop will perform.

In some embodiments, while it is, in general, not always known in advance how many times a loop will get executed, the number of iterations is known in cases typically matching the requirements for replacement. More precisely, such loops are counting loops with known boundaries which are typically used to initialize or update data structures consisting of tables or vectors of information whereby the number of components the data structure has in known and often also a fixed value.

In some embodiments, one method for automatic detection of code sections, which are to be replaced by code executed by the simulation environment, includes checking all counting loops and replacing such loops if the number of iterations multiplied by the estimated execution time of the loop body exceeds a boundary, e.g. a threshold, provided by the developer.

In some scenarios and embodiments, having located candidates for replacement, the compiler refrains from generating code for the loop to be replaced, but generates code serving the same purpose as the omitted loop and able to be executed on the simulation environment, generates a breakpoint at the machine instruction immediately following the omitted code, the breakpoint later serving as trigger for starting the replacement code.

In some embodiments, the mechanism of a) switching between the software being executed by the simulated processor and the simulation environment and b) exchanging data via access to memory M that is accessible by both, utilizes the processor being simulated and the simulation environment to pass parameters into the software being simulated to vary the test case and increase test coverage.

Figure 5:
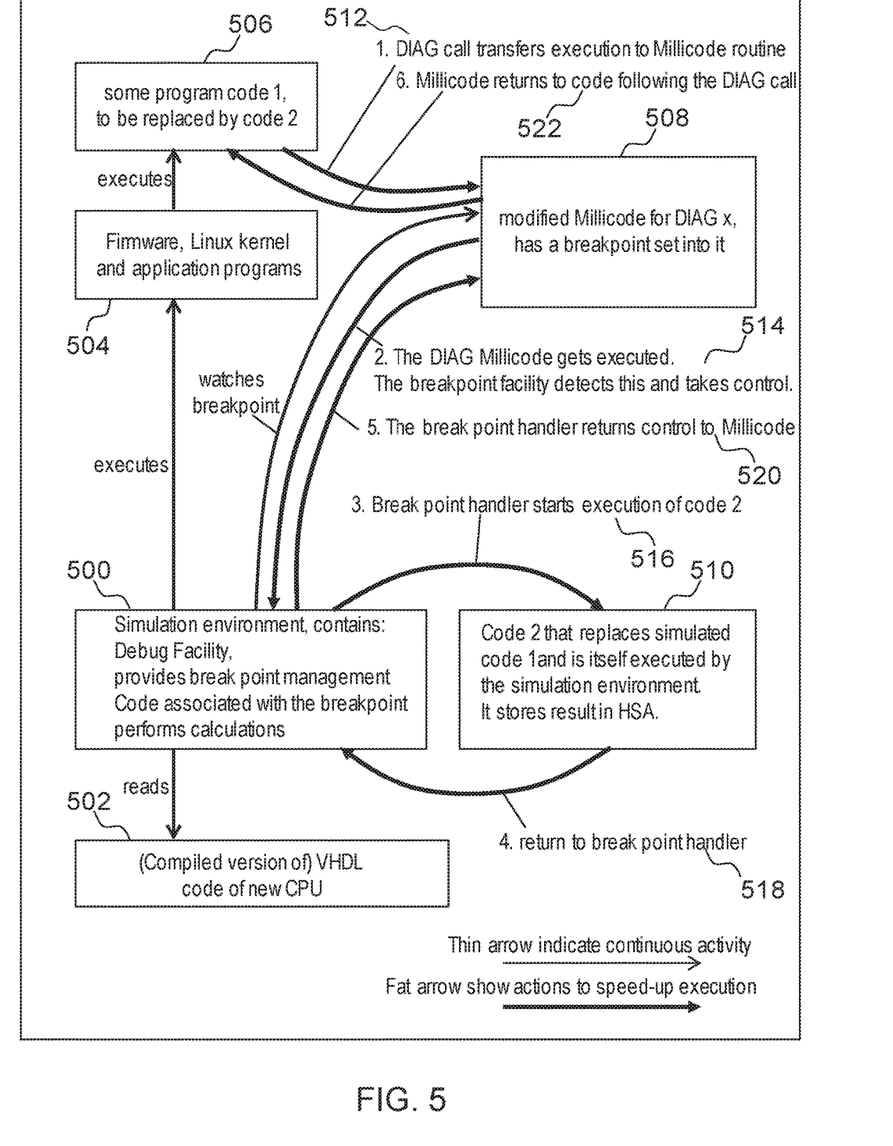
FIG. 5 illustrates a process flow for the simulation of a virtual processor, in accordance with an exemplary embodiment of the present invention.

FIG. 5 shows a flowchart which illustrates one example. Block 500 represents the simulation environment and contains a debug facility which provides breakpoint management. The simulation environment also contains code associated with the breakpoint that performs calculations. Block 502 represents a simulation environment reading a compiled version of the HDL code of a new CPU. The block 504 represents the simulation environment executing firmware, latest kernel and other application programs. The code is further executed indicated by block 506 and some of the program code 1 is replaced by code 2. The code 1 represents the blocks 300, 300', 300" and 300'" shown in FIGS. 3 and 4. The code 2 represents the code 118, 118' and 118" shown in FIGS. 3 and 4. The simulation environment constantly watches breakpoints in modified millicode for a DIAG x (diagnostic) or communication instruction which has a breakpoint set into it. The block 510 represents blocks of code 2 replacing the simulated code 1. The block of code 2 is executed by the simulation environment. It stores its result in the Hardware System Area (HSA). The HSA may, for example, contains tables that include information about the current hardware configuration. The arrow labeled 512 from box 506 to 508 represents DIAG call transfers execution to the millicode routine.

Next the arrow from block 508 to 500 labeled 514, this represents that the DIAG millicode gets executed. The breakpoint facility detects this and takes control. The arrow labeled 516 is between boxes 500 and 510. This represents the breakpoint handler starting execution of code 2. The arrow labeled 518 and going from block 510 to block 500 presents a return of the breakpoint handler. The simulation environment 500 then executes the code watching for the next breakpoint. The arrow labeled 520 coming from block 500 to block 508 represents the breakpoint handler returning control to the millicode. Then finally in arrow labeled 522 going from block 508-506 represents the millicode returning to code following the DIAG call.

Figure 6:
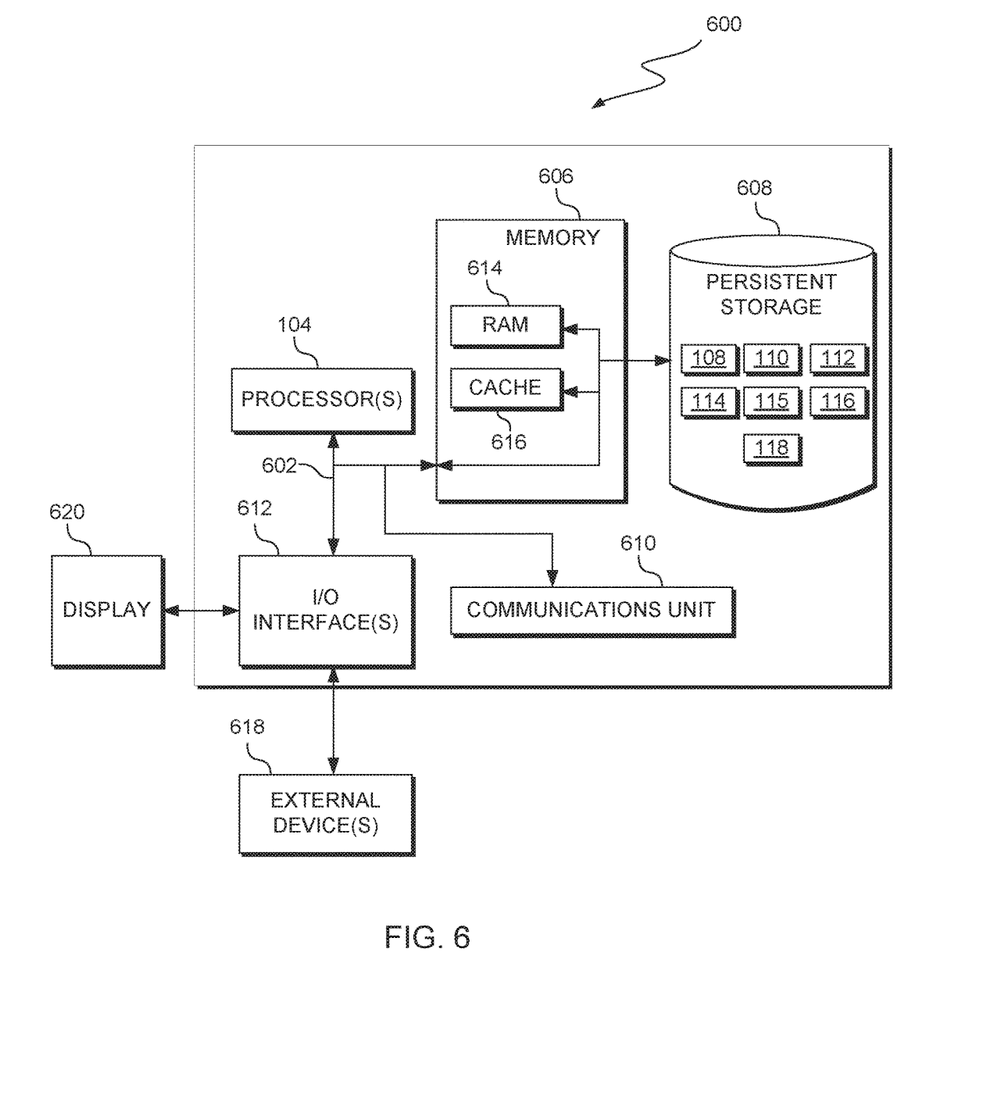
FIG. 6 depicts a block diagram of components of the computing device executing a virtual processor simulation, in accordance with an exemplary embodiment of the present invention.

FIG. 6 depicts a block diagram, 600, of components of computing device 102, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 102 includes communications fabric 602, which provides communications between computer processor(s) 104, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Machine instructions 108, virtual processor model 110, program instructions 112, breakpoint 114/resume point 115 pairs, state data 116, and program instruction fragment(s) 118 are stored in persistent storage 608 for execution and/or access by one or more of the respective computer processors 104 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 130. In these examples, communications unit 610 includes one or more network interface cards. Communications unit 610 may provide communications through the use of either or both physical and wireless communications links. Machine instructions 108, virtual processor model 110, program instructions 112, breakpoint 114/resume point 115 pairs, state data 116, and program instruction fragment(s) 118 may be downloaded to persistent storage 608 through communications unit 610.

I/O interface(s) 612 allows for input and output of data with other devices that may be connected to computing device 102. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., machine instructions 108, virtual processor model 110, program instructions 112, breakpoint 114/resume point 115 pairs, state data 116, and program instruction fragment(s) 118, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A method for executing a simulation of a virtual processor comprising:
    receiving, by one or more processors, a breakpoint, wherein the breakpoint is paired with a resume point;
    executing, by the one or more processors, a set of machine instructions on a virtual processor model;
    halting, by the one or more processors, execution of the set of machine instructions on the virtual processor model at the breakpoint;
    executing, by the one or more processors, a fragment of a program instruction on a physical processor, wherein the fragment is logically equivalent to the set of machine instructions between the breakpoint and the resume point;
    loading, by the one or more processors, a processed result into the virtual processor model, wherein the processed result results from executing the fragment on the physical processor; and
    resuming, by the one or more processors, the execution of the set of machine instructions on the virtual processor model at the resume point.

2. The method of claim 1, further comprising:
    storing, by the one or more processors, a state data, wherein the state data describes a virtual processor model state at the breakpoint; and
    sending, by the one or more processors, the state data to the physical processor for use during execution of the fragment on the physical processor.

3. The method of claim 1, further comprising:
    receiving, by the one or more processors, a program source code;
    transforming, by the one or more processors, the program source code into the set of machine instructions with a first program source code translator;
    locating, by the one or more processors, a code fragment in the program source code, wherein the code fragment is a portion of the program source code corresponding to the set of machine instructions between the breakpoint and the resume point; and
    transforming, by the one or more processors, the code fragment into the program instruction fragment with a second program source code translator.

4. The method of claim 3, further comprising:
    detecting, by the one or more processors, a program loop in one or both of: the program source code and the set of machine instructions; and
    selecting, by one or more processors, the breakpoint based, at least in part, on the presence of the program loop.

5. The method of claim 4, wherein the program loop calculates at least one firmware control block.

6. The method of claim 1, further comprising:
    estimating, by the one or more processors, an execution time for one or more portions of the set of machine instructions; and
    selecting, by the one or more processors, the breakpoint based, at least in part, on the execution time for the one or more portions of the set of machine instructions.

7. The method of claim 1, wherein the machine instructions are one or both of: millicode and firmware code.

* * * * *